United States Patent [19]

Watanabe

[11] 4,027,745
[45] June 7, 1977

[54] ELEVATOR SPEED CONTROL SYSTEM
[75] Inventor: Eiki Watanabe, Inazawa, Japan
[73] Assignee: Mitsubishi Denki Kabushiki Kaisha, Tokyo, Japan
[22] Filed: Aug. 11, 1975
[21] Appl. No.: 603,627
[30] Foreign Application Priority Data
  Aug. 30, 1974 Japan .............................. 49-100456
[52] U.S. Cl. .............................................. 187/29 R
[51] Int. Cl.² ............................................ B66B 1/30
[58] Field of Search ................. 187/29; 323/19, 24, 323/34

[56] References Cited
UNITED STATES PATENTS

| | | | |
|---|---|---|---|
| 3,435,916 | 4/1969 | Bell et al. ............................ | 187/29 |
| 3,743,055 | 7/1973 | Hoelscher et al. ................. | 187/29 |
| 3,921,058 | 11/1975 | Tanaka et al. ....................... | 323/19 |
| 3,938,624 | 2/1976 | Maynard ............................. | 187/29 |

*Primary Examiner*—Robert K. Schaefer
*Assistant Examiner*—W. E. Duncanson, Jr.
*Attorney, Agent, or Firm*—Wenderoth, Lind & Ponack

[57] ABSTRACT

An electric generator energizes a driving motor for an elevator car. In order to control the generator field, a control circuit compares a command speed signal with a sensed speed signal of the elevator car and applies the result of the comparison to the field through a filter of electrically higher order operative to cancel out a resonance and an antiresonance frequency of a mechanical system formed of the elevator car and associated mechanical components.

8 Claims, 13 Drawing Figures

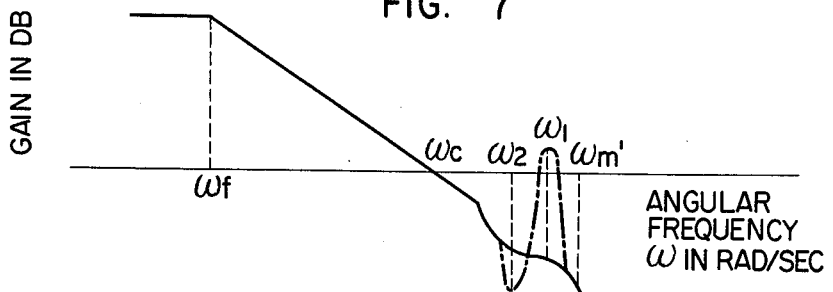
FIG. 7
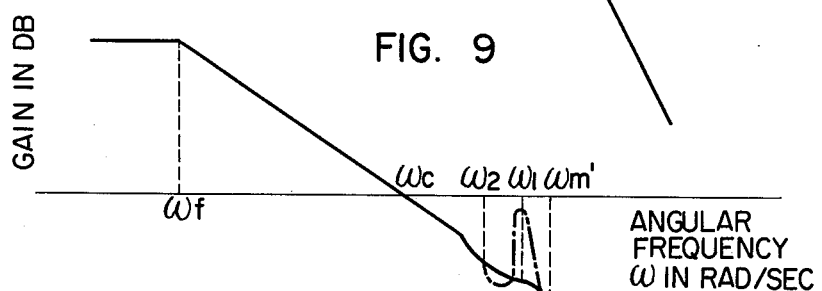
FIG. 9
FIG. 8
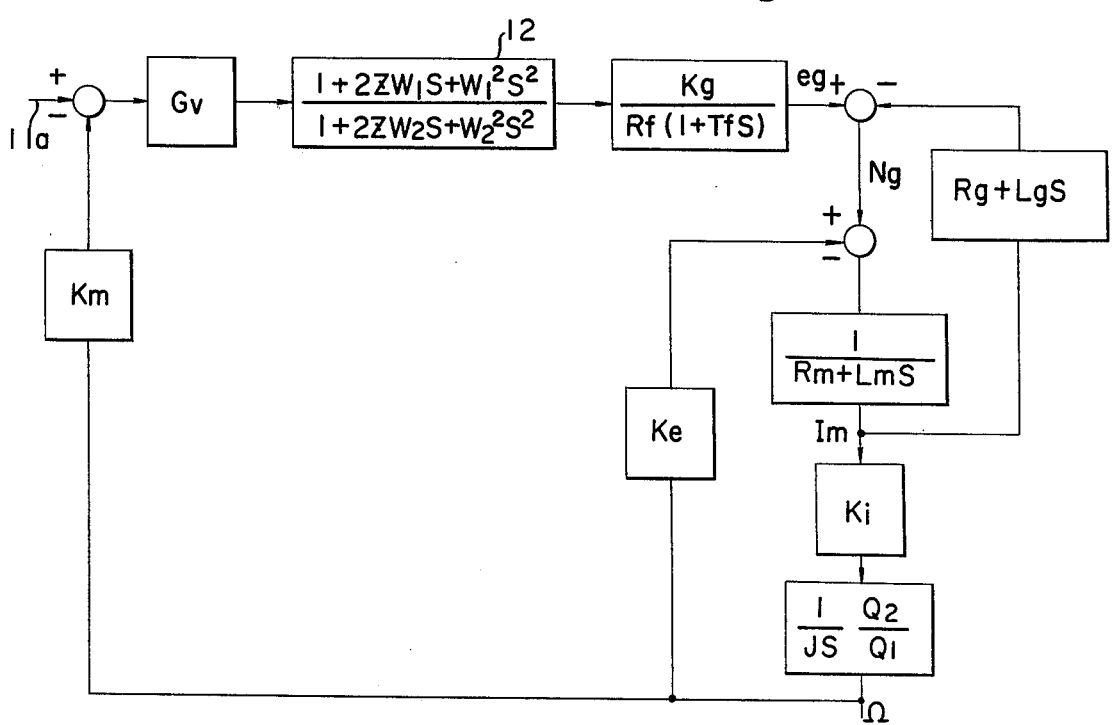

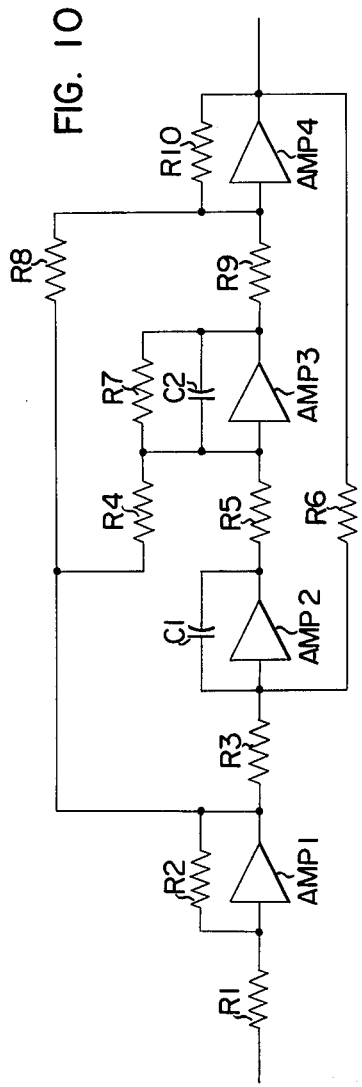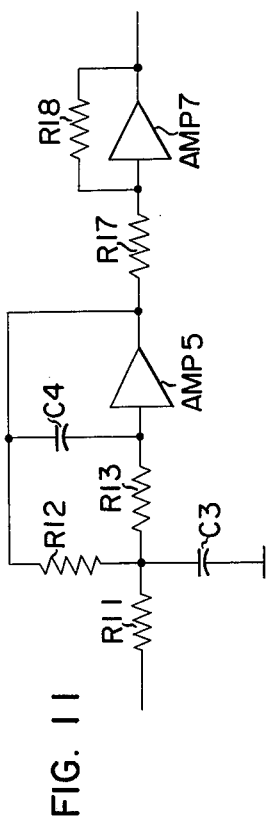

ELEVATOR SPEED CONTROL SYSTEM

BACKGROUND OF THE INVENTION

This invention relates to an elevator speed control system, and more particularly to a speed control system for automatically controlling a speed of an elevator car by comparing a command speed signal with a negatively fed-back signal for the actual speed of the elevator car.

Conventional speed control systems of the type referred to have comprised an electric generator for energizing an electric motor for driving an elevator car, the command speed generator for generating a command speed signal, a speed sensor for sensing the actual speed of the elevator car, and a field control circuit for comparing the command speed signal with the actual speed signal negatively fed back from the speed sensor to automatically control the speed of the elevator car in accordance with the result of the comparison.

In the case of high rise elevators, a mechanical system formed of the elevator car and associated mechanical components has had such a low resonance frequency that the mechanical system may interfere with the speed control system resulting in the possibility of causing oscillation In order to avoid this objection, the speed control system may have a decreased response which is not desirable. Also it is difficult to increase the resonance frequency of the mechanical system for the same purpose.

Accordingly it is an object of the present invention to provide a new and improved elevator speed control system which is prevented from becoming unstable even if an associated mechanical system has a decreased resonance frequency thereby to ensure the stable operation of an elevator car involved.

SUMMARY OF THE INVENTION

The present invention provides an elevator control system for automatically controlling the speed of an elevator car. The control system comprises a control circuit having applied thereto both a command speed signal and a signal for the actual speed of the elevator car. The difference between two signals is applied to a filter of electrically higher order operative to cancel out the resonance and the antiresonance frequency of a mechanical system formed of the elevator car and its associated mechanical components. The output from the filter is used to control the energization of the field of an electric generator for energizing a driving motor for the elevator car.

BRIEF DESCRIPTION OF THE DRAWINGS

The present invention will become more readily apparent from the following detailed description taken in conjunction with the accompanying drawing in which:

FIG. 5b is a diagram of a mechanical system equivalent to the arrangement shown in FIG.5a;

FIG. 7 is a graph illustrating the actual and simplified gain characteristics for an overall transfer function shown in FIG. 6;

FIG. 8 is a block diagram of a transfer function illustrating an elevator speed control system constructed in accordance with the principles of the present invention;

FIG. 9 is a graph illustrating the gain characteristics for the transfer function shown in FIG. 8;

FIG. 10 is a circuit diagram of a higher order filter constructed in accordance with the principles of the present invention;

FIG. 11 is a view similar to FIG. 10 but illustrating a modification of the arrangement shown in FIG. 10; and FIG. 12 is a combined block and circuit diagram of an elevator speed control system constructed in accordance with the principles of the present invention;

The several FIGURES like reference characters designate like parameters.

DESCRIPTION OF THE PREFERRED EMBODIMENTS

Figure 1:
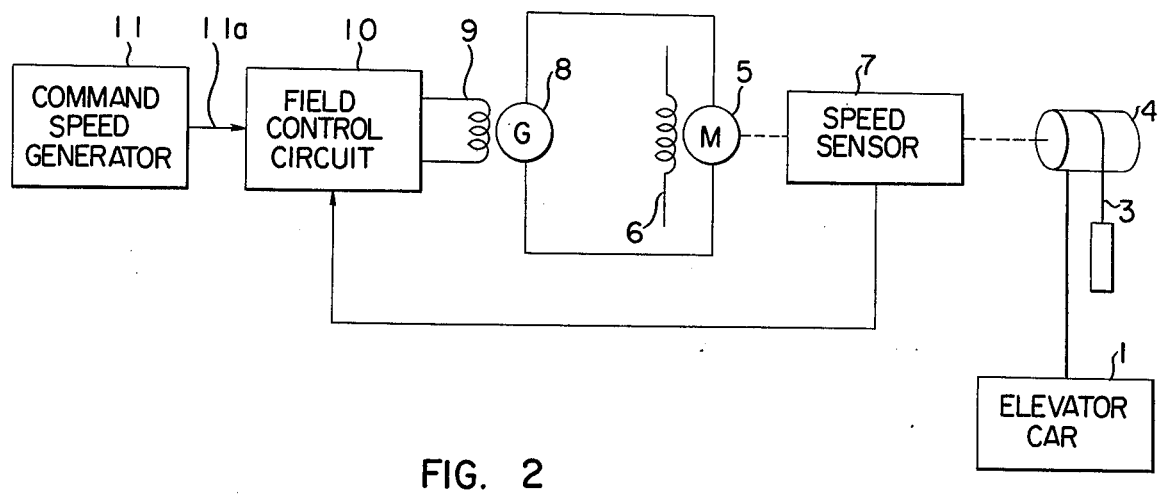
FIG. 1 is a block diagram of an elevator speed control system constructed in accordance with the principles of the prior art.

Referring now to the drawings and FIG. 1 in particular, there is illustrated a conventional control system for controlling the speed of an elevator car. The arrangement illustrated comprises an elevator car 1, a counter weight 2 connected to the car 1 through a hoisting rope 3 passed around a sheave 4, and an electric motor shown as including an armature 5 and a separately excited field 6 to drive the sheave 4. The armature 5 is directly connected to a speed sensor 7 and is energized by an electric generator shown as including an armature 8 and a field 9. A field control circuit 10 is connected across the field 9 to control the excitation of the field 9.

The output from the speed sensor 7 is fed back to the field control circuit 10 where it is compared with a command speed signal 11a from a command speed generator 11. Then the speed of the elevator car 1 is controlled in accordance by the result of this comparison of both signals.

If an elevator car such as shown in FIG. 1 rises a long distance then the corresponding mechanical system formed of mechanical components such as the elevator car 1, the counter weight 2, the rope 3 etc. has a low resonance frequency which could interfere with mated speed control system to cause the oscillation of the speed control system. To avoid this oscillation, the speed control system may be given a decreased response. However where the landing performance is required to be rapid as in elevator systems, it is impossible to excessively decrease the response of the speed control system and at the same time it is difficult to increase the resonance frequency of the associated mechanical system.

Figure 2:
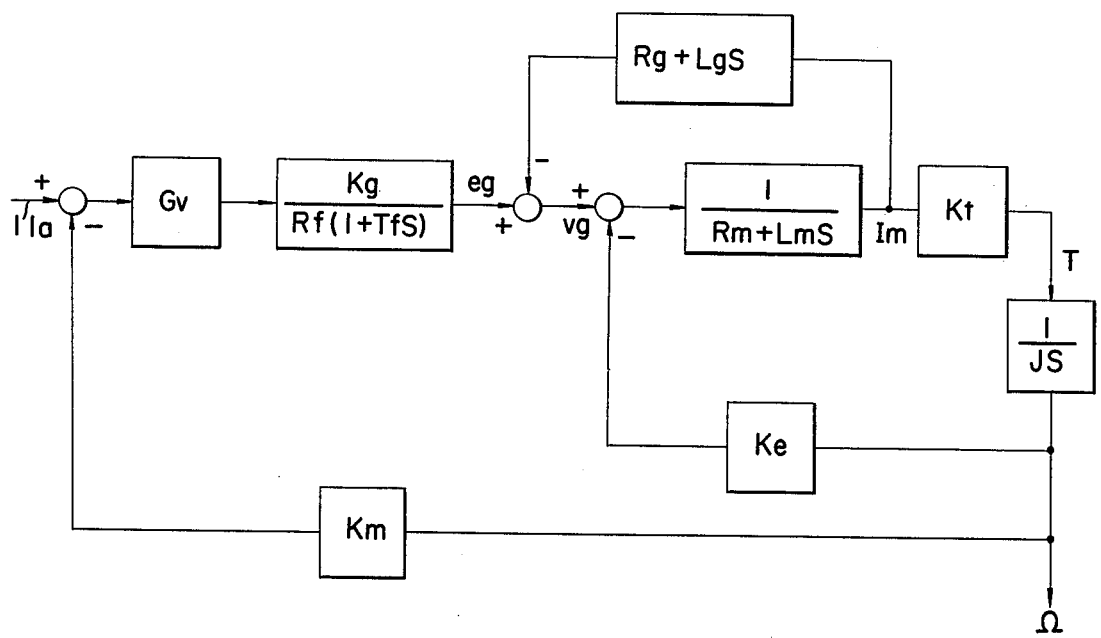
FIG. 2 is a block diagram of a transfer function exhibited by the speed control system shown in FIG. 1.
Figure 3:
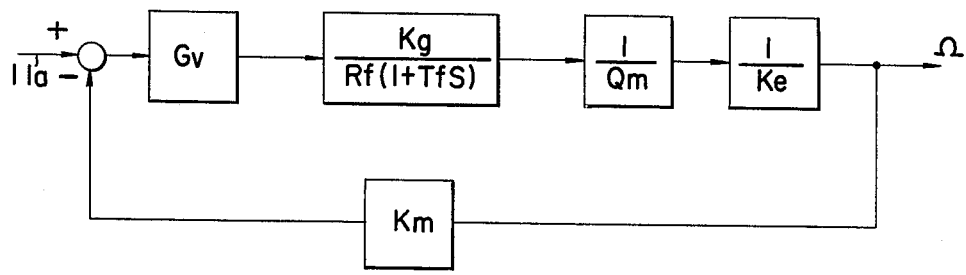
FIG. 3 is a block diagram of a transfer function simplified through the equivalent transformation of the transfer function shown in FIG. 2.

The reasons for which the oscillation is caused will now be described with respect to FIG. 2. FIG. 2 illustrates a transfer function for the elevator speed control system as shown in FIG. 1 including the abovementioned mechanical system having a resonance frequency high enough to permit the mechanical system to be considered to be rigid such as a low rise elevator is. The transfer function of FIG. 2 will readily to be understood from the following definition of various parameters and constants denoted in FIG. 2:

$G_v$ = transfer function of field control circuit 10
$K_g$ = constant of electromotive force of electric generator
$R_f$ = resistance of circuit with generator field 9
$I_f$ = time constant of circuit with generator field 9
$e_g$ = electromotive force of generator
$V_g$ = voltage across generator
$R_g$ = resistance of circuit with generator armature 8
$L_g$ = inductance of circuit with generator armature 8
$R_m$ = resistance of circuit with motor armature 5
$L_m$ = inductance of circuit with motor armature 5
$K_t$ = torque constant of motor
$T$ = torque of motor
$K_3$ = constant of counter electromotive force of generator
$J$ = moment of inertia converted in terms of motor shaft
$\Omega$ = angular velocity of motor shaft
$S$ = operator
$I_m$ = current through motor armature 5
$K_m$ = speed feed back transfer characteristic FIG. 3 illustrates a transfer function reduced through the equivalent transformation of the transfer function as shown in FIG. 2. In FIG. 3 $Q_m$ is expressed by $$Q_m = 1 + \frac{R_g + R_m}{K_e K_t} JS + \frac{L_g + L_m}{K_e K_t} JS^2$$

Therefore the $Q_m$ has a break frequency of $\omega_m$ expressed by $$\omega_m = \sqrt{K_e K_t/(L_g + L_m)J}$$

Figure 4:
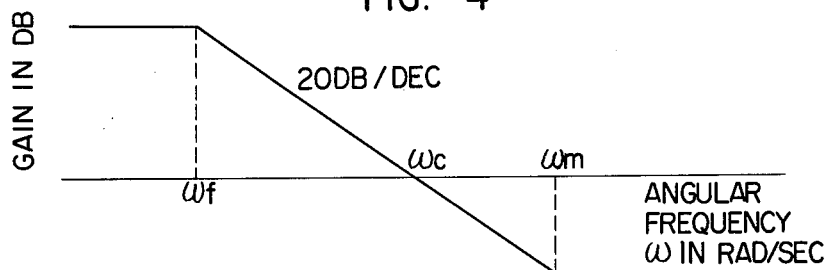
FIG. 4 is a graph illustrating the gain characteristic given by the overall transfer function shown in FIG. 3.

FIG. 4, wherein the gain in decibels is plotted on the ordinate against the angular frequency $\omega$ in radians per second in abscissa shows the gain characteristic in a simplified form given by an overall transfer function as illustrated in the block diagram of FIG. 3. In FIG. 4 the generator field 9 has a break point at an angular frequency of $\omega_f$ equal $1/T_f$ and the generator and motor armatures 8 and 5 respectively forming a closed loop circuit have a double break point at an angular frequency of $\omega_m$. As shown in FIG. 4, a gain is attenuated or damped at a rate of 20 db/decade for $\omega \geq \omega_f$ and at a rate of 60 db/decade for $\omega \geq \omega_m$ because the double break point appears at the angular frequency of $\omega_m$.

It is well known that, in order to stabilize the operation of the overall control system, the gain characteristic curve should pass through a point of null decibel with a slope of 20 db/decade and have the same slope remaining unchanged until the curve goes somewhat negative after its passage through the null value. An angular frequency of $\omega_c$ at which the gain is of a null decibel or an angular cut-off frequency is determined by determining the response rate of the particular system. It is required to select the break-point angular frequency $\omega_m$ with respect to the angular cut-off frequency so as to maintain the system stable.

Figure 5A:
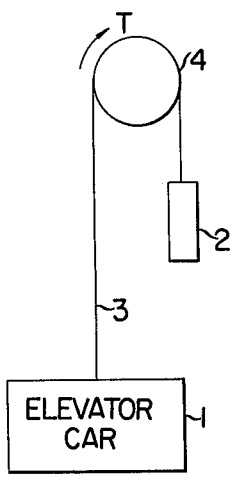
FIG. 5a is a schematic diagram of the elevator car and associated mechanical components shown in FIG. 1.
Figure 5B:
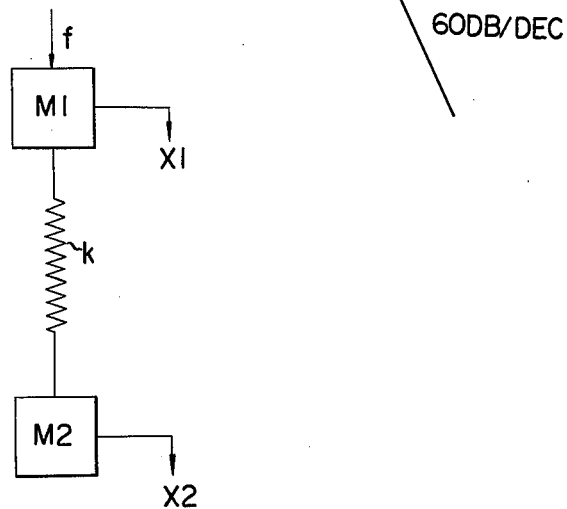

It is now assumed that the elevator is a very high rise elevator and the associated mechanical system as above described has a resonance frequency low enough not to permit the mechanical system to be considered to be a rigid body. Under the assumed condition, the mechanical system has a minimum value of resonace frequency when the elevator car 1 is at the uppermost or lowermost floor. Therefore it is also assumed that the elevator car 1 is at the lowermost floor as shown in FIG. 5a wherein like reference numerals designate the components identical to those illustrated in FIG. 1. The arrangement of FIG. 5a has its status as approximately shown in FIG. 5b. In FIG. 5b, $x1$ and $x2$ designate displacements of the counter weight $z$ and car 1 respectively. The hoisting rope 3 has a spring constant of K and the sheave 4 has a force generated at the effective diameter thereof. M1 designates the sum of the mass of the counter weight 2, the equivalent mass of the sheave 4 and the motor armature 5 (see FIG. 1) and one half the mass of the hoisting rope 3. M2 designates the mass of the elevator car 1 plus one half the mass of the hoisting rope 3.

It is further assumed that the mechanical system as shown in FIG. 5b has a negligibly small damping factor only for purposes of simplification, and that the sheave 4 receives a torque of $T = fr$ in the clockwise direction as viewed in FIG. 5a to be rotated at an angular velocity of $\Omega$ radians per second, where $r$ designates the effective radius of the sheave 4. Then the mechanical system of FIG. 5b fulfills the following equations of motion:

$$M2\ddot{x}2 + (x2 - x1)K = 0$$

and $$M1\ddot{x}1 - (x1 - x2)K = f$$

also the counter weight 2 is moved at a velocity of $x1 = \Omega r$.

Substituting $x1 = \Omega r$ into the equation of motion for the M1 and solving both equations of motion yields $$\Omega = \frac{1}{r^2(M1 + M2)S} \cdot \frac{Q_2}{Q_1} T$$

where $$Q_1 = \frac{M1 M2}{(M1 + M2)K} S^2 + 1$$

$$Q_2 = (M2/K)S^2 + 1$$

By expressing $(M1 + M2)r^2$ by J, $\Omega = (1/JS)(Q_2/Q_1) T$ is obtained.

Figure 6:
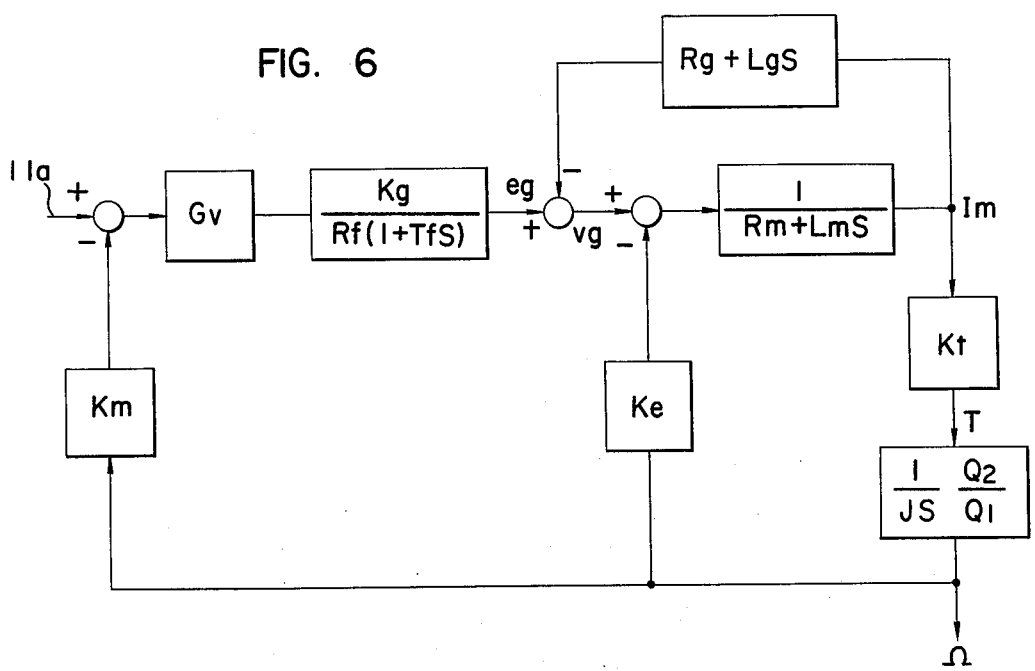
FIG. 6 is a block diagram of a transfer function for the entire arrangement shown in FIG. 1 taking account of the mechanical system shown in FIG. 5b.

Therefore the overall control system has the transfer characteristic as shown in the block diagram in FIG. 6. By comparing FIG. 6 with FIG. 2 it is seen that the transfer fuction as shown in FIG. 6 is different from that illustrated in FIG. 2 only in that in FIG. 6 $1/JS)(Q_2/Q_1)$ is substituted for $(1/JS)$ shown in FIG. 2.

From the transfer function of FIG. 6 it is seen that $Q_1$ and $Q_2$ represent a resonance and an antiresonance respectively. Also an angular resonance frequency $\omega_1$ for $Q_1$ and an angular antiresonance frequency $\omega_2$ for $Q_2$ are calculated at $$\omega_1 = \sqrt{\frac{(M1 + M2)K}{M1 M2}} \text{ and } \omega_2 = \sqrt{\frac{K}{M2}}$$

respectively. The overall transfer function as shown in the block diagram of FIG. 6 has a gain characteristic as shown in FIG. 7 wherein the gain is plotted against the angular frequency in the same manner as in FIG. 4. In FIG. 7 it is noted that the $\omega_1$ and $\omega_2$ are shown as being located between the angular cut-off and breakpoint frequencies $\omega_c$ and $\omega'_m$ respectively. In that event it is apparent that the $\omega_1$ is higher than $\omega_2$ and that the $\omega'_m$ is equal to $(R_m + R_g)/(L_m + L_g)$. It is also to be noted the solid curve describes the gain characteristic in its simplified form. However the gain characteristic actually deviates from the simplified characteristic over a range of from an angular frequency slightly less than the angular antiresonance frequency of $\omega_2$ to an angular frequency somewhat less than the break-point angular frequency of $\omega_m$ as shown by the dotted and dashed line in FIG. 7. It will readily be understood that the mechanical system is actually damped to prevent the gains at the frequencies of $\omega_2$ and $\omega_1$ from increasing to a negative and a positive infinity respectively.

From the foregoing it will be appreciated that conventional speed control systems for a high rise elevator have a resonance frequency for which the gain thereof may have again a positive value provided that the associated mechanical system is poorly damped. At that time a corresponding phase margin is decreased because the break-point angular frequency of $\omega'_m$ is located adjacent a angular resonance frequency, and the phase rotation through 180° may occur resulting in oscillation of the speed control system.

While for the purposes of simplicity the speed control system has been described on the assumption that the phase margin decreases due to the $\omega'_m$, the transfer function $G_v$ of the field control circuit has a breakpoint at a high frequency and equipment having breakpoints of a higher order may actually be used with speed control systems leading to the increasing disadvantages.

The present invention seeks to eliminate the disadvantages of the prior art practice as above described by the provision of an elevator speed control system which is prevented from becoming unstable in operation due to a decrease in the resonance frequency of the mechanical system involved and which can be expected to perform a stable operation of a particular car.

Refering now to FIG. 8, there is illustrated a block diagram of the transfer function for an elevator speed control system constructed in accordance with the principles of the present invention. The arrangement illustrated is different from that shown in FIG. 2 only in that in FIG. 8 a transfer function designated by the reference numeral 12 is connected to the transfer function $G_v$ of the generator field control circuit. This means that a filter of electrically higher order is connected in the field control circuit for controlling the field of the electric generator such as the field control circuit 10 (see FIG. 1).

In the example illustrated the filter also designated by the reference numeral 12 is of an electrically second order and has a transfer function expressed by $(1 + 2z\omega_1 S + \omega_1^2 S^2)/(1 + 2z\omega_2 S + \omega_2^2 S^2)$ wherein $\omega_1$ designates the angular resonance frequency of the mechanical system, $\omega_2$ the angular antiresonance frequency thereof and $z$ designates the damping factor of the filter 12.

When this damping factor $z$ of the filter 12 is selected to be substantially equal to a damping constant of the mechanical system as above described, an overall transfer function given by the speed control system as shown in FIG. 8 has the gain characteristic as shown by the solid curve A in FIG. 9. More specifically, the gain characteristic of the filter 12 substantially cancels out that of the mechanical system so that the gain does not exceed a value of 0 db for $\omega$ $\omega_c$. Thus the speed control system is maintained stable. If the transfer function of the filter 12 as above described has its numerator equal to unity then the filter 12 has the gain characteristic as shown by the dotted curve B in FIG. 9. The dotted curve B depicts that the gain is negative at the angular resonance frequency of $\omega_1$ resulting in a stable operating of the speed control system as for the solid curve A.

While the present invention has been described in terms of the filter 12 having the angular resonance and antiresonance frequencies identical to the angular antiresonance and resonance frequencies of the mechanical system respectively it is to be understood that upon practicing the present invention, the filter is not necessarily required to be identical in angular resonance and antiresonance frequencies to the mechanical system. It has been found that a similar result is obtained by a filter having its angular antiresonance and resonance $\omega_1'$ and $\omega_2'$, respectively less than the angular resonance and antiresonance frequencies of the mechanical system respectively as long as both angular frequencies of the filter are somewhat higher than the cut-off frequency $\omega_c$ of the particular speed control system.

A filter 12 having the transfer function of $(1 + 2z\omega_1 S + \omega_1^2 S^2)/(1 + 2z\omega_2 S + \omega_2^2 S^2)$ can be formed, by way of example, as a circuit having the configuration as shown in FIG. 10. As shown in FIG. 10, a plurality, in this case four, resistors R1, R3, R5 and R9 alternate in series circuit relationship with operational amplifiers AMP1, AMP2, AMP3 and AMP4 which have high gains. Each of the first and last operational amplifiers AMP1 or AMP4 includes a feedback resistor R2 or R10 connected across the output and input thereof while the intermediate operational amplifiers AMP2 and AMP3 include feedback capacitors C1 and C2 connected across the outputs and inputs thereof respectively.

The output of the operational amplifier AMP1 is connected to the input of the operational amplifier AMP4 through a resistor R8 and to the input of the operational amplifier AMP3 through a resistor R4 subsequently connected to the output of the amplifier AMP3 through a resistor R7. The output of the operational amplifier AMP4 is connected by a resistor R6 to the input of the operational amplifier AMP2 and also provides an output of a filter thus formed.

A filter having a transfer function of $1/(1 + 2z \omega_2 S + \omega_2^2 S^2)$ can be realized by a circuit configuration as shown in FIG. 11. In FIG. 11, a pair of serially connected resistors R11 and R13 is connected of an input to a high gain operational amplifier AMP5. The junction of the resistors R11 and R13 is connected to ground through a capacitor C3 and also to the output of the operational amplifier AMP5 through a resistor R12. The operational amplifier AMP5 includes a feedback capacitor C4 connected across the output and input. The output of the operational amplifier AMP5 is connected to the input of the operational amplifier AMP7 through a resistor T17, and the AMP7 has a feedback resistor R18 connected across the output and input.

In the arrangements as shown in FIGS. 10 and 11, the values of resistors and capacitors can be chosen in order to select $z$, $\omega_1$ and $\omega_2$ at will.

The filter shown in FIG. 10 or 11 is connected in the field control circuit 10 (see FIG. 1) such as shown in FIG. 12. The arrangement illustrated comprises the command speed generator 11 as shown in FIG. 1, and a comparison circuit including a high gain operational amplifier AMP6 and supplied with a command signal 11a from the generator 10 through a resistor R14. The operational amplifer AMP6 has an output connected to its input through a resistor R16 and also to a filter 12 such as above described in conjunction with FIG. 10 or 11. As in the arrangement of FIG. 1, the sensed speed signal from the speed sensor 7 is applied through a resistor R15 of the input to operational amplifier AMP6 where it is compared with the command speed signal 11a.

The operational amplifier AMP6 is connected to the input to the filter 12 such as the resistor 1 (FIG. 10) or the resistor R11 (FIG. 11). The output of the filter 12 such as the output of the operational amplifier AMP4 (FIG. 10) or the operational amplifier AMP7 (FIG. 11) is connected to thyristor firing circuit 13 subsequently connected to a thyristor amplifier 14 having a bidirectional conducting property. The amplifier 14 is connected across the field 9 of the electric generator.

It will be appreciated that the speed control circuit 10 as shown in FIG. 12 operates in the same manner as that illustrated in FIG. 1 while the filter 12 ensures an extremely stable control operation as above described.

Thus it can be seen that the present invention provides an elevator speed control system including a filter of electrically higher order to prevent the interference of the speed control system with the mechanical system including the high rise elevator car and its associated components thereby to operate the car in an extremely stable manner.

While the present invention has been illustrated and described in conjunction with a few preferred embodiments thereof it is to be understood that various changes in details of the construction and the arrangement of parts may be resorted to without departing from the spirit and scope of the present invention.

What is claimed is:

1. An elevator speed control system comprising, in combination, an elevator car, a hoisting rope for suspending said elevator car, and a sheave engaging said hoisting rope to form a mechanical system having an angular resonance frequency and an angular antiresonance frequency, command speed generator means for generating a command speed signal for the elevator car, speed sensor means for sensing the actual speed of said elevator car, speed control means including comparison circuit means for comparing said command speed signal with a signal for said actual speed of said elevator car, and filter means of electrically higher order connected in said speed control means to cancel out said angular resonance and antiresonance frequencies of said mechanical system, said speed control means being operative to control said mechanical system in response to the result of the comparison made by said comparison circuit means and through said filter means.

2. An elevator speed control system as claimed in claim 1 wherein said filter means of electrically higher order has transfer function expressed by $(1 + 2z\omega_1 S + \omega_1^2 S^2)/(1 + zz\omega_2 S + \omega_2^2 S^2)$ where $\omega_1$ and $\omega_2$ designate said angular resonance and antiresonance frequencies of said mechanical system respectively, $z$ designates a damping factor of said filter means and S designates the Laplace operator.

3. An elevator speed control system as claimed in claim 1 wherein said filter means of electrically higher order has a transfer function expressed by $1/(1 + 2z\omega_2 S + \omega_2^2 S^2)$ where $\omega_2$ designates said angular antiresonance frequency of said mechanical system $z$ designates a damping factor of said filter and S designates the Laplace operator.

4. An elevator speed control system as claimed in claim 1 wherein said filter means of electrically higher order is formed of resistors, capacitors and operational amplifiers interconnected to provide a predetermined transfer function of higher order.

5. A elevator speed control system comprising, in combination, an elevator car, a hoisting rope for suspending said elevator car and a sheave engaging said hoisting rope to form a mechanical system having an angular resonance frequency, command speed generator means for generating a command speed signal for the elevator car, speed sensor means for sensing the actual speed of said elevator car, speed control means including comparison circuit means for comparing said command speed signal with a signal for said actual speed of said elevator car, and filter means of electrically higher order connected in said speed control means and having an angular resonance frequency between said angular resonance frequency of said mechanical system and an angular cut-off frequency of said speed control means which is in the form of an open loop, said speed control means being operative to control said mechanical system in response to the result of the comparison made by said comparison circuit means and through said filter means.

6. An elevator speed control system as claimed in claim 5 wherein said filter means of electrically higher order has a transfer function expressed by $(1+2z\omega_1' s + \omega_1'^2 S^2)/(1+2z\omega_2' S + \omega_2'^2 S^2)$, where $\omega_1'$ and $\omega_2'$ designate the angular antiresonance and resonance frequencies of said filter means, Z designates a damping factor of said filter means, and S designates the Lapace operator, $\omega_1'$ and $\omega_2'$ being less than the angular resonance and antiresonance frequencies of said mechanical system and higher than the cutoff frequency $\omega_c$ of said speed control means.

7. An elevator speed control system as claimed in claim 5 wherein said filter means of electrically higher order has a transfer function expressed by $1/(1+2Z\omega_2' S + \omega_2'^2 S^2)$, where $\omega_2'$ designates the angular resonance of said filter means, Z designates the damping factor of said filter means, and S designates the Laplace operator, $\omega_2'$ being less than the angular resonance frequency of said mechanical system and higher than the cutoff frequency $\omega_c$ of said speed control means.

8. An elevator speed control system as claimed in claim 5 wherein said filter means of electrically higher order is formed of resistors, capacitors and operational amplifiers interconnected to provide a predetermined transfer function of higher order.

* * * * *